Sept. 1, 1970   W. W. SHRADER   3,526,811
ELECTRONIC CROWBAR SYSTEM

Filed Nov. 2, 1967   2 Sheets-Sheet 1

INVENTOR
WILLIAM W. SHRADER
BY Irving S. Rappaport
ATTORNEY

United States Patent Office 3,526,811
Patented Sept. 1, 1970

3,526,811
ELECTRONIC CROWBAR SYSTEM
William W. Shrader, West Newton, Mass., assignor to Raytheon Company, Lexington, Mass., a corporation of Delaware
Filed Nov. 2, 1967, Ser. No. 680,077
Int. Cl. H02h 3/12
U.S. Cl. 317—16            10 Claims

ABSTRACT OF THE DISCLOSURE

A device for selectively providing for a predetermined time a low resistance path across a high-power utilization device upon the detection of an abnormal rise in current in the utilization device comprising an improved electronic crowbar system including a plurality of spark gaps having a trigger circuit for firing the gaps upon detection of an abnormal rise in current in the utilization device and a discharge means connected across substantially all of the gaps except one or more at each end of the crowbar for insuring instantaneous firing of the gaps when an arc occurs in the utilization device operating at full or partial voltage.

BACKGROUND OF THE INVENTION

The present invention relates to an electronic circuit protection device and more particularly to a device for diverting energy away from an electronic circuit which may be damaged by such energy.

The recent utilization of high-power transmitters has found a need for the development of devices capable of protecting R-F generators, high-vacuum modulator tubes, and high-voltage components in the event of an arc in any of these components. This need is particularly evident in equipment operating at high voltage with large values of stored energy in capacitor banks. The high voltage increases the probability of arcing and the high energy increases the probability of catastrophic destruction of the components.

Of course, most power supplies and capacitor banks are supplied with circuit breakers which will be tripped when an arc is developed in the utilization device. However, circuit breakers are not entirely satisfactory since such devices require a mechanical movement causing their trip time to be relatively long. Also, if the circuit breaker is in the power supply circuit the energy stored in the capacitor bank will still be permitted to discharge through the utilization device, thereby causing damage. On the other hand, if the breaker is incorporated in the capacitor bank circuit, an arc may develop across the breaker or the capacitor bank may be left with a potentially dangerous charge.

Such electronic protection devices are commonly referred to as electronic crowbars. One type of electronic crowbar is a multiple fixed-gap system that is sequentially fired by a signal applied at approximately the mid-point of the gap system. One such electronic crowbar which is representative of the prior art is shown in U.S. Pat. 3,260,895. The electrodes of the gap system are in-line-staggered metal rods, each of whch is connected to a dividing resistor and a capacitor to ground. Each end of the rod serves as an electrode of the adjacent gap. These discharge resistors are all of equal value and provide uniform voltage division between gaps. This permits equal gap spacings to be used. The gap spacing is determined by the breakdown voltage of the atmosphere, the maximum operating voltage and the desired degree of safety. The size of the dividing resistors is determined by a compromise between the amount of leakage current that can be tolerated and the time constant of the gap system dictated by the rate of application of voltage. The capacitor from each electrode to ground is selected to be an order of magnitude greater than the interelectrode capacitance of the gaps. A coupling capacitor is provided which is a minimum of five times the total capacitance of the system to ground.

In order for a protection device such as an electronic crowbar to successfully protect the utilization device, it must have the following characteristics: (a) rapid firing after application of the trigger pulse, (b) low voltage drop after firing, (c) low energy triggering capability, (d) large range of operating voltage i.e., the device should be capable of being triggered when there is zero voltage across the utilization device. The need for (a) and (b) alone is evident; the device must achieve a condition approaching that of a short circuit across the arcing component as rapidly as is possible so as to divert the energy from the arc before any damage has occurred. The diverter obviously must be capable of passing the short-circuit current value without being damaged itself. The low triggering requirement is dictated by the usual desire for circuit simplicity and small size, but is also necessary to minimize any pulse signal that may appear in the main circuit during triggering of the spark gaps. Requirement (d) stems from the possible need for circuit operation over a wide voltage range for which protection is desired. This is particularly needed in high-power electron tube processing equipment where arcing is possible at the lower values of plate-supply voltage, until seasoning of the electron tube permits stable operation at the higher voltages. There is, however, a need for low-plate-voltage triggering capability to provide for a repetitive firing of the spark gaps and the opening of the circuit breakers, in order to prevent reinitiation of the arc in an electron tube that may have evolved gas during the initial stages of the original arc. In addition to the characteristics discussed above, the diverter must reliably hold off the desired high voltage without self-triggering induced either by atmospheric effects or the normal pulses appearing in the main circuit. A low value of acoustic energy generated by the firing of the spark gaps is also desirable.

The purpose of an electronic crowbar is to discharge the energy in a capacitor filter bank if a short circuit should develop in the load. This prevents the capacitor bank from discharging through and probably destroying the load. (The load may be for example an R-F generating device such as a klystron.)

In FIG. 3 which is an embodiment of the prior art, for voltages above 80 kilovolts, open-air devices have been used as electronic crowbars. Operation of the type crowbar as described in U.S. Pat. 3,260,895 under transient conditions of the klystron arcing is probably insufficient to protect the klystron. This insufficiency is due to the following reasons. Assume the prior art crowbar has 28 gaps, which break down at 10 kv. each. They are initially charged to $nV/28$. That is, the first gap has charge $V/28$, the second $2V/28$, etc. When the klystron arcs (if it has not been conducting) the voltage at the top of the crowbar goes to zero. All gaps break down until the one with slightly less than $-10$ kv. is reached. (If $V=-150$ kv., 26 gaps break down and 2 don't. If $V=-100$ kv., 25 gaps break down and 3 don't. If $V=-50$ kv., 22 gaps break down and 6 don't.) Note that this effectively shorts out all triggering from the middle, or anyhere near the middle. The remaining gaps will fire when the voltage on top of the crowbar recovers to about $-22$ kv. This assumes 4 pf. stray capacitance and 30 pf. to ground. This voltage on top of the crowbar will reach $-22$ kv. when the current through the klystron reaches 2900 amps. When $-22$ kv. is reached, all the remaining gaps fire. Due to the circuit parameters, the maximum voltage on top of the crowbar will be reached in about 15 microseconds and will be about 25 percent of V. Thus, if V equalled $-150$ kv., the remaining gaps are fired in about 4 microseconds. If V equals $-90$ kv., the remaining gaps fire in 15 microseconds. Below $-90$ kv., the remaining gaps do not fire. In any case, the current through the klystron must reach 2900 amps before the crowbar is fired. This, of course, is intolerable. The results are essentially the same if an initial current through the klystron is assumed. For example, assume 300 amps is flowing when the arc occurs. The voltage on top of the crowbar, instead of dropping to zero, drops to $-2.25$ kv. Thus, the number of gaps firing will be either the same or one or two less, depending on the initial voltage. In any case, the triggers are shorted and the voltage on top of the crowbar must recover to $-24$ kv. before the remainder of the gaps fire. This takes essentially the same amount of time. Therefore, the fault current in the klystron must reach 2900 amps with a time delay of at least four microseconds, before the crowbar is fired.

SUMMARY OF THE INVENTION

The above and other disadvantages of the prior art are overcome in the present invention by providing in a circuit having a high-voltage power supply, an energy storage capacitor bank and a high-power utilization device, means for selectively providing a low resistance path around the utilization device for a predetermined time longer than the time required to completely discharge the capacitor bank and to disconnect the power supply comprising: current sensing means for sensing currents passing through the utilization device above a predetermined level; energy diverter means comprising a plurality of electrodes connected to form a series of spark gaps extending across the utilization device; trigger means connected between the sensing means and the diverter means for applying trigger pulses for the predetermined time to the diverter of a sufficient amplitude to cause breakdown of the spark gaps upon the detection by the current sensing means of a current in the utilization device above a predetermined level; and discharge means connected across substantially all the gaps except one or more spark gaps at each end of the energy diverter means for causing self-firing of all the gaps of the diverter means when an arc occurs in the utilization device near full operating voltage and for causing symmetrical firing of the gaps at both ends of said diverter means which firing enables triggering of the remaining gaps by the trigger means when an arc occurs in the utilization at partial operating voltage.

The approach taken in the present invention to solve the problems of the prior art is to provide a multigap electronic crowbar circuit employing a capacitor which bridges all except a few gaps at each end of the crowbar. The following improvements result from the present invention; (A) When a load arc occurs, the crowbar self triggers over a wider range of high voltage than it would without the capacitor; (B) When a load arc occurs, the crowbar self triggers when it would not have without the capacitor; (C) The crowbar can be immediately externally triggered after a load arc, whereas it could not be without the capacitor; (D) The crowbar fires more rapidly with the capacitor than without, thus improving protection of the load.

It is therefore the object of this invention to provide a protection device for diverting energy away from a utilization device which may be damaged by such energy, and wherein the diverter circuit meets all of the desired requirements discussed above. Other objects and features of the invention will become apparent to those skilled in the art as the disclosure is made in the following description of a preferred embodiment of the invention as illustrated in the accompanying drawings.

DESCRIPTION OF THE PREFERRED EMBODIMENTS

Figure 1:
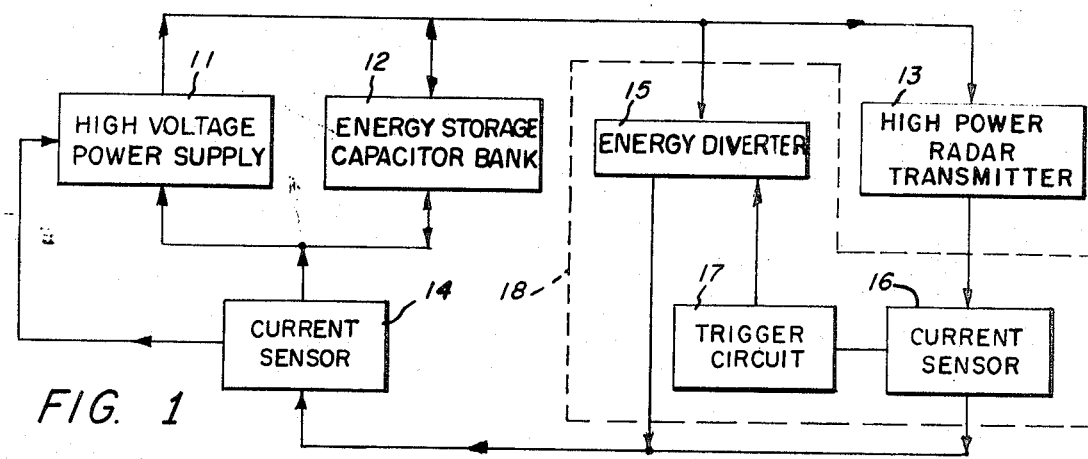
FIG. 1 shows a block diagram of the present invention in an environment in which it might be used to protect a utilization device.

Referring now to the drawings, wherein like reference characters designate like or corresponding parts throughout the several views, there is shown in FIG. 1, a high-voltage power supply 11 for supplying energy to an energy storage capacitor bank 12 which in turn is periodically discharged through an oscillator tube such as a high power klystron, magnetron, etc. for generating R-F energy in the conventional high power radar transmitter 13. A current sensor 14 is also provided in the return path between the radar 13 and the capacitor bank 12 to measure the rate at which the energy from capacitor bank 12 is being supplied to radar 13. If an arc should develop in any of the R-F generators, high-vacuum modulator tubes or high-voltage components of radar 13, the rate of energy supplied will increase to a dangerous level thereby increasing the current in the return path through current sensor 14. Current sensor 14 will then detect this rise in current and supply a signal to a circuit breaker in the power supply 11. However, the conventional mechanical circuit breakers have a relatively long trip time and are ineffective as stated above for protection of the arcing component. Protection of these components is provided, however, by providing an energy diverter 15 in the form of an electronic crowbar in the system between the capacitor bank 12 and the radar 13 for diverting the energy away from the radar while the circuit breaker in power supply 11 is being tripped. A second current sensor 16 will detect the overload or increase in current through radar 13 and energize a trigger circuit 17 which, in turn, will energize the diverter 15.

Figure 2:
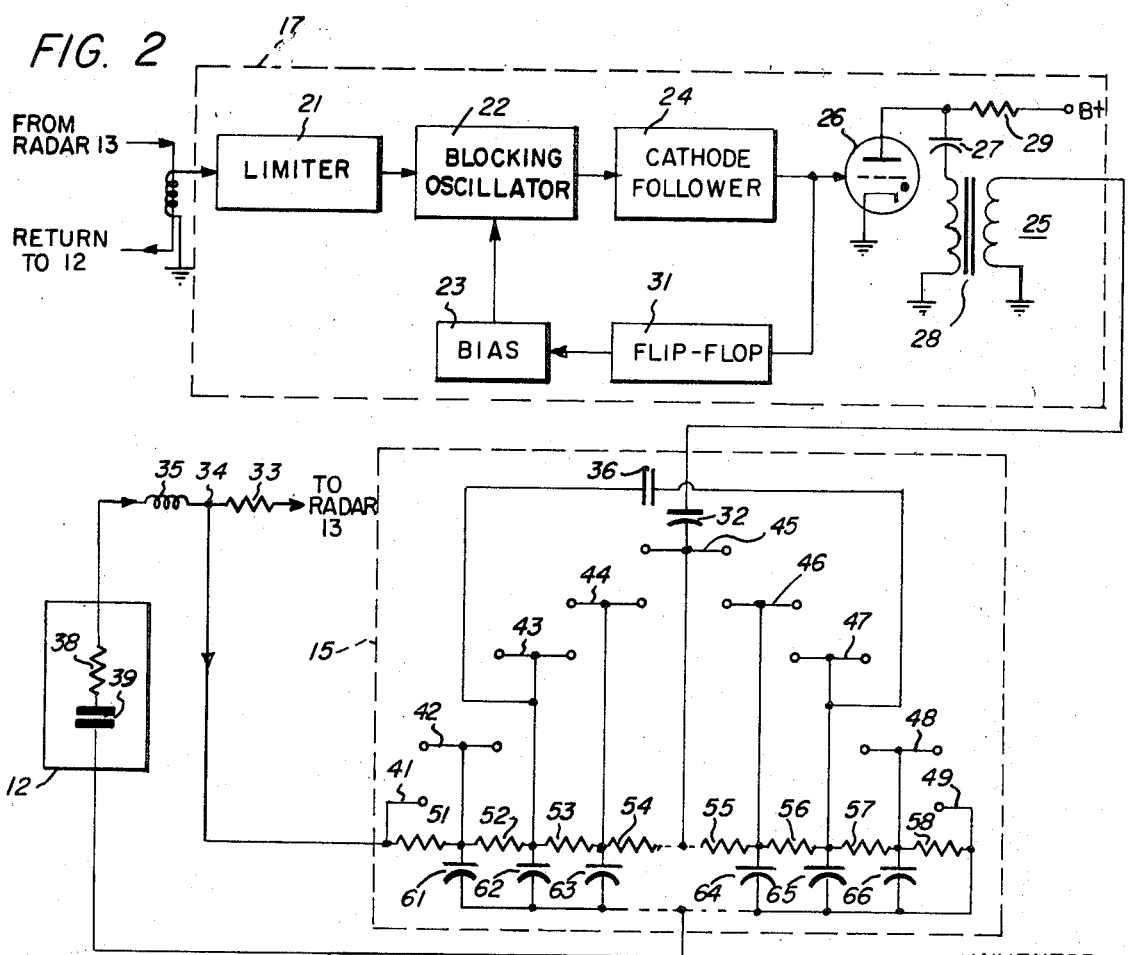
FIG. 2 shows a schematic diagram of the details of the crowbar and its associated circuits.

The components enclosed by dotted line 18 in FIG. 1, i.e. diverter 15 or crowbar 15, trigger circuit 17 and current sensor 16 are shown in detail in FIG. 2.

Current sensor 16, which may be a current transformer and is shown schematically as a coil wound around the return lead of the radar transmitter 13, is connected to a limiter 21 in the trigger circuit 17. Limiter 21 which may simply be a back biased diode, will determine the allowable level of current desirable in the return lead of radar 13. If the current in the return lead should rise above the allowed level, the output from coil 16 will be passed by limiter 21 on to the blocking oscillator 22 as a synchronous signal to initiate oscillations. Blocking oscillator 22 is normally biased to cut off by bias circuit 23. The oscillations from blocking oscillator 22 is fed to pulse generator 25 through a cathode follower 24. Cathode follower 24 is provided for matching purposes and will isolate the pulse generator 25. Pulse generator 25 comprises a thyratron 26 whose control electrode is connected to the output of the cathode follower 24. A capacitor 27 and a step-up transformer 28 are connected across the plate-cathode circuit which is also connected to a high B+ voltage through a limiting resistor 29. Capacitor 27 will be charged by the B+ voltage when thyratron 26 is cut off. When a pulse appears on the control electrode thyratron 26 is turned on and capacitor 27 is permitted to discharge through the step-up transformer 28 and the thyratron 26 to provide a high voltage pulse to the diverter 15. It can therefore be seen that when the output from coil 16 exceeds the back-bias voltage of limiter 21, blocking oscillator 22 will become a free-running oscillator whose frequency of oscillation is controlled by an R-C circuit to any desired interpulsed interval, thereby providing a series of pulses to thyratron 26. Pulse generator 25 which is controlled by the oscillator 22 will then provide a series of trigger pulses to diverter 15 through the transformer 28. As was explained earlier, it is desirable that the diverter 15 be energized or fired when there is little or no current in the return lead from radar 13 after an arc has been initiated. This is necessary since electronic components and tubes in radar 13 may be damaged even at low voltages immediately after such elements have experienced an arc. Therefore, to insure that the diverter is operating at all times until the circuit breakers are open and the capacitor bank 12 is fully discharged, the bias 23 on oscillator 22 is removed for this period. This is accomplished by sampling the first pulse from cathode follower 24 and feeding this sample to a flip-flop circuit 31. The output pulse from flip-flop 31 is fed to bias circuit 23 to remove the bias on oscillator 22 to permit oscillations even when there is no further signal from sensor 16. The period of the output pulse from flip-flop 31 is adjusted such that it is longer than the trip time of the circuit breakers in the power supply. Therefore, oscillator 22 be periodically energizing pulse generator 25 for the entire time between the detection of the arc and the desired time after the opening of the circuit breakers.

Figure 3:
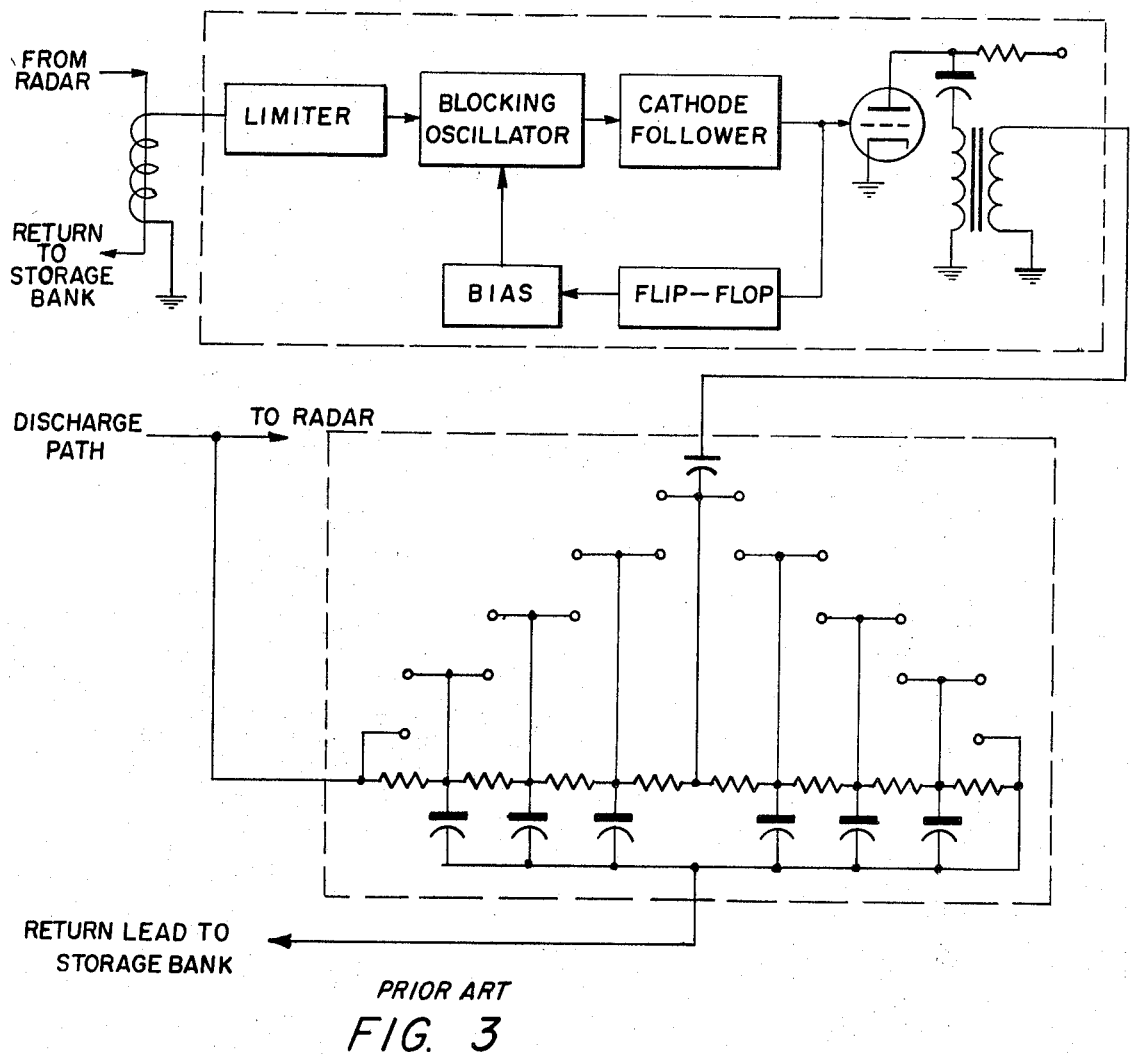
FIG. 3 is an embodiment of the prior art as described above.

Diverter 15 is coupled to the trigger circuit 17 by a coupling capacitor 32 which is connected to the center electrode 45 of an array of successive electrodes 41–49 in diverter 15. As shown by the broken lines, the diverter may have more than the gaps shown in FIG. 3. The particular embodiment shown is for purposes of describing the invention. A voltage divider consisting of a series of resistors 51–58 is connected from the high voltage side of radar 13 via a resistor 33 which is connected to junction 34 to the return or ground lead and to each of the electrodes 41–49 to distribute the high voltage evenly across the spark gaps formed by electrodes 41–49. The discharge path from bank 12 is applied to junction 34 via an inductor 35. Electrodes 42, 43, 44, 46, 47 and 48 are each coupled to the return lead or ground by a series of capacitors 61–66 respectively. Electrode 41 is connected directly to the high voltage side at junction 34 while electrode 49 is coupled directly to the return lead. The bank 12 as shown in the embodiment of the invention in FIG. 2 includes a series connected resistor 38 and a capacitor 39. A capacitor 36 is connected across the electrodes 43–47 so that it spans almost all the electrodes except a few on each end of diverter 15. In the embodiment shown, capacitor 36 spans all the electrodes except 41 and 42 on the high voltage side and 48 and 49 on the return lead side of diverter 15. The number of electrodes on each end of the diverter 15 which are not encompassed by capacitor 36 is flexible and is chosen in accordance with the number electrode included in the particular diverter chosen.

In the operation of the diverter 15 firing of the diverter is either initiated by a high-voltage pulse from the trigger circuit 17 or the diverter is self-triggered. Capacitor 32 which is a coupling capacitor has a relatively large capacitance compared to the capacitance of the spark gaps and the capacitors 61–66 and will, therefore, contain only a negligible amount of pulse voltage during operation. Capacitor 36 is chosen to be at least ten times the value of the individual capacitors 61–66. The capacitance of each spark gap is much smaller than the capacitance of each capacitor 61–63. Therefore, the majority of the pulse voltage from trigger circuit 16 will be across the spark gap formed by electrodes 44–43, while only a small amount will exist across capacitor 62. Of course, this same voltage will also appear across the spark gap formed by electrodes 46–47 and the capacitor 65, since this circuit is in parallel with the former circuit.

When an arc occurs, the resistor 33 and the inductor 35 cause a voltage drop at the junction 34. In the prior art where capacitor 36 is not employed some of the spark gaps at the high voltage end at junction 34 of the diverter 15 fire, thus shorting out the external triggering circuit 17, preventing triggering of the diverter 15. In the present invention under transient conditions when a spark occurs, the voltage at the junction 34 drops and the spark gaps formed by electrodes 41–42, 42–43, 47–48, and 48–49 not encompassed by the capacitor 36 fire symmetrically. At full operating voltage, this results in instantaneous self-firing of the remainder of the gaps. Therefore, in the present invention by the addition of capacitor 36, the diverter self-triggers in a fraction of a microsecond when the load spark occurs. The time delay of the present invention is believed to be only a few nanoseconds.

Without the capacitor 36, when the load arcs under partial voltage conditions, the gaps on only one end of the diverter would break down, thereby shorting out the triggering. With the capacitor 36, when the load arcs under partial voltage conditions, symmetrical breakdown of the gaps occurs at each end of the crowbar, which permits immediate external triggering by the trigger circuit 17.

In tests of the present invention, a 28 gap crowbar circuit 15 was utilized and the capacitor 36 was a 500 pf. capacitor connected from between the fourth and fifth gap to between the 24th and 25th gap. The resistor 33 had a value of 7.5 ohms, the inductor 35 had an inductance of 150 mh., the resistor 38 had a value of 20 ohms, and the capacitor 39 had a capacitance of 3.2 mf. The addition of this capacitor 36 caused the whole crowbar 15 to instantly self trigger when the load arced for voltages from −150 kv. down to about −40 kv. The capacitor 36 did not interfere with triggering for voltages from 0 to −40 kv., if the crowbar 15 was triggered in the center. The crowbar 15 is a full range device when externally triggered, but most important, it instantly protects the load when the load arcs.

In other tests of the present invention, a 20 gap crowbar circuit 15 was utilized and the capacitor 36 was a 5000 pf. capacitor connected from between the fourth and fifth gap to between the 17th and 18th gap. The whole crowbar would instantly self trigger when the load arced for voltages from −150 kv. down to about −40 kv. The capacitor 36 did not interfere with triggering for voltages from 0 to −40 kv., and the crowbar was a full range device when externally triggered.

To consider how this capacitor 36 aids operation imagine the 28 gap crowbar with −150 kv. applied. The voltage on the capacitor 36 will be $$\left(\frac{24}{28} - \frac{4}{28}\right)$$

(−150 kv.) which is −107 kv. When the load sparks, the voltage on the top of the crowbar 15 drops to zero causing the gaps to start firing from the top. When the top four gaps have fired, the voltage on the top end of the capacitor 36 goes from −129 kv. to 0 kv. causing the voltage on the other end of the capacitor to go from −21 kv. to +108 kv. This causes the bottom eight gaps of the crowbar to fire. Since these are the gaps that normally do not fire during self triggering, self triggering will now succeed. If the crowbar is triggered from the center when there is no voltage applied, the breakdown will proceed at equal speed in both directions, reaching both ends of the capacitor at the same time. Thus, the capacitor 36 will not load the trigger voltage.

In the circuit shown in FIG. 2, the inductance 35 between the power supply and the load prevents the current in the load from rising rapidly in the event of a spark. The inductance 35 contributes to the rapid self-triggering of the diverter 15. Although in the embodiment of the present invention in FIG. 2, this element 35 is an inductance, a single resistor or a resistor-inductor combination of appropriately chosen values could also serve to contribute to the rapid self-triggering of the diverter 15. It should be recognized that inherent in an energy storage capacitor bank 12 is usually sufficient internal resistance to ensure rapid self-triggering of the diverter 15. Also, even though tests of the present invention were described with respect to 20 gap and 28 gap crowbars, the invention may be employed with any number of gaps sufficient for operation of the invention. The connection of the capacitor 36 of the invention may be made across substantially all the gaps of the crowbar except for one or more at each end of the crowbar.

Although the present invention has been described in a preferred embodiment, there may be many modifications which may be made within the scope of the appended claims. In addition, because this invention solves several problems which have plagued prior art high voltage crowbars, the present invention may enjoy a number of applications including those such as in both commercial and military high voltage transmitters.

I claim:

1. In a circuit having a high-voltage power supply, an energy storage capacitor bank and a high-power utilization device, means for selectively providing a low resistance path around the utilization device for a predetermined time longer than the time required to completely discharge the capacitor bank and to disconnect the power supply comprising:
    current sensing means for sensing currents passing through the utilization device above a predetermined level;
    energy diverter means comprising a plurality of electrodes connected to form a series of spark gaps extending across the utilization device;
    trigger means connected between the sensing means and the diverter means for applying trigger pulses for the predetermined time to the diverter of a sufficient amplitude to cause breakdown of said spark gaps upon the detection by said current sensing means of a current in the utilization device above a predetermined level; and
    discharge means connected across substantially all the gaps except at least one spark gap at each end of said energy diverter means for causing self-firing of all the gaps of the diverter means when an arc occurs in the utilization device near full operating voltage and for causing symmetrical firing of the gaps at both ends of said diverter means, which firing enables triggering of the remaining gaps by the trigger means when an arc occurs in the utilization at partial operating voltage.

2. The device as described in claim 1 wherein the first electrode of said series of electrodes is connected to one side of said utilization device and the last electrode of said series of electrodes is connected to the other side of said utilization device while an intermediate electrode is connected to said trigger means.

3. The device of claim 2 and wherein a series of resistors are connected to said electrodes, each across said spark gap, whereby said high voltage is distributed across said spark gaps in some predetermined fashion.

4. The device of claim 3 wherein a plurality of capacitors are connected each between a different one of said electrodes, except said last, first and intermediate electrodes and said other side of said utilization device.

5. The device of claim 1 wherein said discharge means is a capacitor connected across substantially all the gaps except one or more gaps on each end of said diverter means.

6. A device for selectively providing for a predetermined time a low resistance path across a high-power utilization device upon the detection of an abnormal rise in current in said utilization device comprising:
    a series of electrodes mounted to form a plurality of spark gaps connected in series with each other and extending across said utilization device;
    a plurality of resistors connected in series with each other and connected across said utilization device, each of said resistors being connected across a different one of said spark gaps, the first electrode in said series being connected directly to one side of said utilization device and the last electrode of said series being connected directly to the other side of said utilization device;
    a plurality of capacitors each connected between said other side of said utilization device and to a different one of said electrodes except for said first, said last and an intermediate electrode;
    trigger means connected to said intermediate electrode for providing pulses for said predetermined time and of sufficient value to cause successive breakdown of said spark gaps from said intermediate gap to said first and last gaps upon the detection of an abnormal rise in current in said utilization device by a current detector connected thereto; and
    a capacitor connected across substantially all the gaps except at least one spark gap at each end of said diverter means for causing self-firing of all the gaps of the diverter means when an arc occurs in the utilization device near full operating voltage and for causing symmetrical firing of the gaps at both ends of said diverter means, which firing enables triggering of the remaining gaps by said trigger means when an arc occurs in the utilization device at partial operating voltage.

7. A device for selectively providing for a predetermined time a low resistance path across a high power utilization device upon the detection of an abnormal rise in current in said utilization device comprising:
    a series of electrodes mounted to form a plurality of spark gaps connected in series with each other and extending across said utilization device;
    a plurality of resistors connected in series with each other and connected across said utilization device, each of said resistors being connected across a different one of said spark gaps, the first electrode in said series being connected directly to one of said utilization device and the last electrode of said series being connected directly to the other side of said utilization device;
    a plurality of capacitors each connected between said other side of said utilization device and to a different one of said electrodes except for said first, said last and an intermediate electrode;
    trigger means connected to said intermediate electrode for providing pulses for said predetermined time and of sufficient value to cause successive breakdown of said spark gaps from said intermediate gap to said first and last gaps upon the detection of an abnormal rise in current in said utilization device by a current detector connected thereto;
    circuit means for dropping the voltage applied to said first electrode when an arc occurs in the utilization device; and
    a capacitor connected across substantially all the gaps except at least one spark gap at each end of said energy diverter means, said capacitor, after the voltage dropping by said circuit means, causing self-firing of all of the gaps of the diverter means when an arc occurs in the utilization device near full operating voltage and causing symmetrical firing of the gaps at both ends of said diverter means, which firing enables triggering of the remaining gaps by said trigger means when an arc occurs in the utilization device at partial operating voltage.

8. The device as described in claim 7 wherein said circuit means includes an inductor-resistor combination, said combination being connected to said first electrode.

9. The device of claim 7 wherein said diverter means is a circuit having from 20 to 40 gaps and said capacitor is connected across substantially all of the gaps except one or more gaps on each end of said diverter means.

10. The device of claim 7 wherein said capacitor connected across substantially all of the gaps has a capacitance value at least ten times the capacitance of the individual capacitors of said plurality of capacitors.

References Cited

UNITED STATES PATENTS

| | | | |
|---|---|---|---|
| 2,840,766 | 6/1958 | Wouk | 317—16 |
| 3,036,239 | 5/1962 | Innis | 315—36 |
| 3,260,895 | 7/1966 | Buffa et al. | 317—16 |
| 3,313,978 | 4/1967 | Miller | 315—36 |
| 3,393,338 | 7/1968 | Lee et al. | 315—36 X |

JAMES D. TRAMMELL, Primary Examiner

U.S. Cl. X.R.

315—36; 317—31, 69